Jan. 5, 1926.  1,568,636
C. F. SPEIDEL
SELF ERECTING FRONT CAMERA
Filed Dec. 28, 1923   2 Sheets-Sheet 1
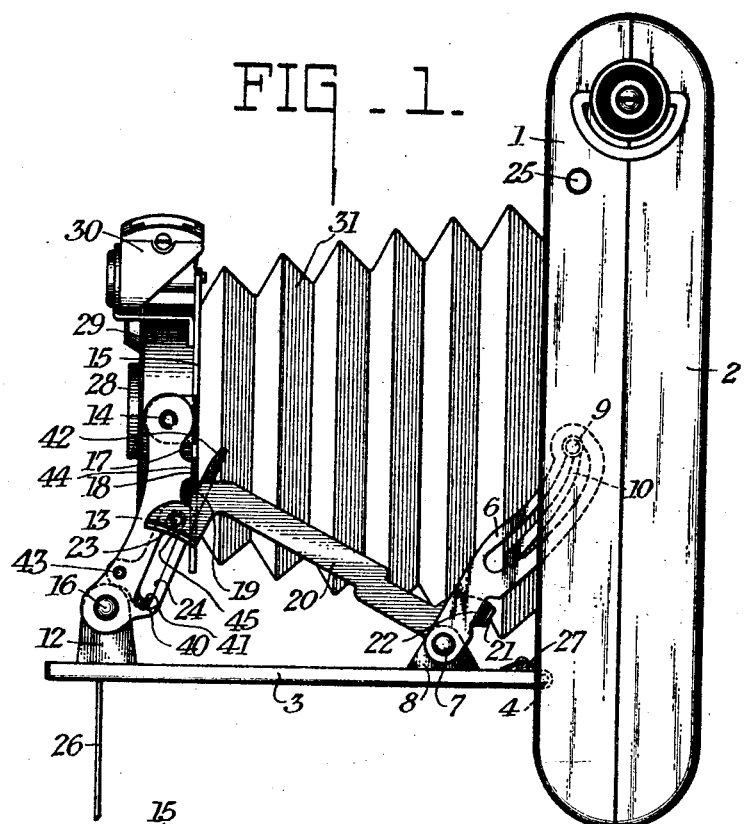
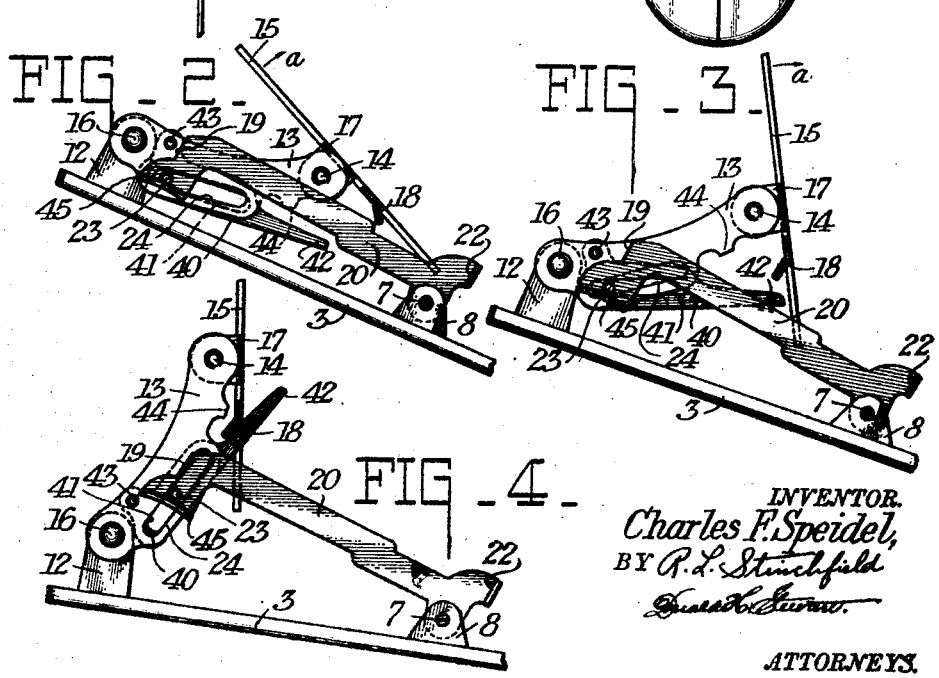
INVENTOR.
Charles F. Speidel,
BY
ATTORNEYS.

Jan. 5, 1926. 1,568,636
C. F. SPEIDEL
SELF ERECTING FRONT CAMERA
Filed Dec. 28, 1923 2 Sheets—Sheet 2
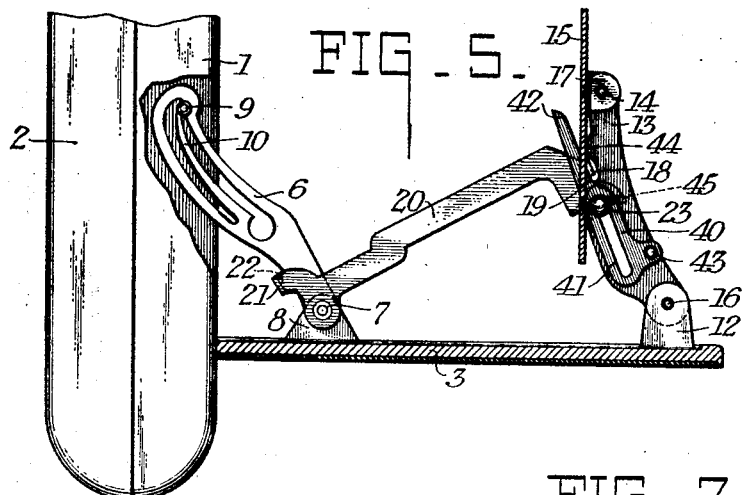
INVENTOR.
Charles F. Speidel,
BY
ATTORNEYS.

Patented Jan. 5, 1926.

1,568,636

UNITED STATES PATENT OFFICE.

CHARLES F. SPEIDEL, OF ROCHESTER, NEW YORK, ASSIGNOR TO EASTMAN KODAK COMPANY, OF ROCHESTER, NEW YORK, A CORPORATION OF NEW YORK.

SELF-ERECTING-FRONT CAMERA.

Application filed December 28, 1923. Serial No. 683,113.

*To all whom it may concern:*

Be it known that I, CHARLES F. SPEIDEL, a citizen of the United States of America, residing at Rochester, in the county of Monroe and State of New York, have invented certain new and useful Improvements in Self-Erecting-Front Cameras, of which the following is a full, clear, and exact specification.

This invention relates to cameras, and more particularly to cameras of the folding type having a folding bed upon which is a support for the camera lens and shutter. The lens board also has a linkage system connected to the camera body and to the bed by which the lens is automatically erected when the bed is lowered into position for use. One object of my invention is to provide a camera of the class described in which an erecting link will position the lens board for latching in erect position; another object is to provide an erecting link which is automatically actuated by other parts of the lens board operating mechanism; another object is to cause the erecting link to function in advance of the latching mechanism; and other objects will appear hereinafter, all as will be fully described in the following specification, the novel features being pointed out in the claims at the end thereof.

This invention is related to the following patents of Robert Kroedel, Nos. 1,380,810, June 7, 1921 and 1,435,646, Nov. 14, 1922; being for a modification of the self-erecting front structure shown in these patents.

In the drawings, wherein like reference characters denote like parts throughout:

Fig. 1 is a side elevation of a camera constructed in accordance with and illustrating one form of my invention;

Figs. 2, 3, and 4 are fragmentary side elevations of the linkage in three successive positions through which they pass in opening the camera;

Fig. 5 is a section taken on line 5—5 of Fig. 7, but with parts omitted for clearness;

Fig. 6 is a front elevation of the camera shown in Fig. 1; and

Fig. 7 is a plan view of the camera shown in Fig. 1 with certain parts omitted.

The camera consists of a body 1, having a removable back 2 and a cover or bed 3 hinged at 4 to the camera body. The bed is supported in open position by bed braces 6 pivoted at 7 to the lugs 8 and having a slidable connection with studs 9. A latch bar 10 holds each brace in a fixed position with respect to its stud 9 when the camera is opened. A pair of forward lugs 12 carry links 13 by studs 16 for holding lens mount 15 through studs 14 passing through lugs 17. A second set of lugs 18 are latched behind cams 19 on the swinging arms 20, also pivoted to the bed by pins 7. Co-operating parts 21 of arms 20, and 22 of the bed braces 6 are in contact and cause these parts to move together for the opening and closing movements. Studs 23 of bracing arms 20 are slidably mounted in the cam slots 24 of the links 13. Thus far the camera is identical with that shown in the Kroedel Patent 1,435,646, operating as fully described in that patent.

A brief review of the operation of the camera thus far disclosed is as follows: Starting with the camera closed, button 25 is pressed allowing spring 27 to move the bed slightly about its pintle 4, in which position it may be grasped and drawn down to the position shown in Fig. 1. A leg 26 may be drawn out if the camera is to stand upon a flat surface. As the bed 3 comes down parts 21 and 22 are brought into contact thus moving the swinging arms 20 about studs 7, raising studs 23 through slots 24. This causes links 13 to rotate upon their pivots 16, drawing the lens board 15 upwardly until cams 19 engage lugs 18 and the front is latched in position. Springs 10 of braces 6 simultaneously snap into locking engagement with pins 9. In this position the lens 28 and shutter 29 with finder 30 are in the open or picture taking position.

The bellows 31 tends to draw the lens board 15 erect (as shown by arrows *a*, Figs. 2 and 3) and has heretofore been the sole means for moving the lens board about the pivots 14 into a position in which lugs 18 may be engaged by cams 19. It has been found, however, that when heavy material is used to make the bellows, the bellows sometimes take a set or fold and will occasionally fail to properly position lugs 18 for locking by braces 20.

My invention provides a positive erecting member by which the lugs will be properly positioned under all circumstances. I provide a member 40 (best shown in Fig. 5) slotted at 41 and having an extending arm 42. It is pivoted at 43 to an arm 13, and the stud 23 from arm 20 passes through slot 41 as well as slot 24. In the drawings the camera is shown as provided with only one erecting member, but I do not limit myself to the use of one only.

The action of this link is as follows: The camera bed 3 is drawn until it reaches the position shown in Fig. 2 at which time lugs 21 and 22 will contact starting arms 20 and links 13 moving about their respective pivots and causing stud 23 to start through slots 24 of supports 13 and slot 41 of the erecting link 40. Because of the relation of their respective pivots, which are offset one from the other, arm 42 will at first separate from part 44 of arm 13 as the parts are moved from position shown in Fig. 2 to that of Fig. 3. Continuing this movement by drawing bed 3 arm 42 is made to accelerate relatively to arm 13, catching behind lug 18, moving the lens board 15 to the position shown in Fig. 4, from which a further rise of arms 20 upwardly will cause cams 19 to ride up behind lugs 18 latching these parts firmly against lugs 44 of arms 13.

As in the Kroedel Patent 1,435,646, the camera can be closed by depressing finger grips 45 thus causing a reversal of the movements above described.

It is to be understood that while the drawings show a convenient form of my invention, I do not wish to be limited to the form shown therein, contemplating as within the scope of my invention all such forms as may come within the scope of the appended claims.

Having thus described my invention what I claim as new and desire to secure by Letters Patent is:

1. In a folding camera, the combination with a body, a bed hinged thereto, a folding lens mount and folding means on the bed pivotally and swingingly supporting the lens mount and provided with guides, of a folding erecting link, pivoted to the pivotally mounted lens mount support and co-operating with the swinging lens mount support for positioning the lens mount in unfolding the camera.

2. In a folding camera, the combination with a body, a bed hinged thereto, a folding lens mount having a support consisting of a pivoted member and a swinging member, the former having a guideway with which a portion of the latter co-operates, of an erecting link carried by the pivoted member and co-operating with the swinging member for positioning the lens mount support as the camera is unfolded.

3. In a folding camera, the combination with a body, a bed hinged thereto, a folding lens mount having a support consisting of a pivoted member and a swinging member, the former having a guideway with which a portion of the latter co-operates, of an erecting link carried by the pivoted member and having a guideway, a part of the swinging member being adapted to engage both of the guideways to position the lens mount and to latch it in place.

4. In a folding camera, the combination with a body, a bed hinged thereto, a folding lens mount having a pivoted supporting member and a swinging member co-operating therewith, of means, carried by the pivoted member for positioning the lens mount before the movement of the swinging member is completed.

5. In a folding camera, the combination with a body, a bed hinged thereto, a folding lens mount having a pivoted supporting member and a swinging member co-operating therewith, there being a pin and slot connection between these parts, of an erecting member pivoted to the slotted member and co-operating with the pin to position the lens mount before the pin has completed its travel through the slot.

6. In a folding camera, the combination with a body, a bed hinged thereto, and a folding lens mount, of mechanism for moving the lens mount to an erect position and retaining it there including a slotted link pivoted to the lens mount, a swinging lever having a slidable engagement with the lens mount and having a pin extending through the slot in the link, an erecting member also having a slot co-operating with the pin on the swinging member adapted to be moved thereby to position the lens board in advance of the completion of the movement of the pin through the slot in the first mentioned slotted link.

7. In a folding camera, the combination with a body, a bed hinged thereto, and a folding lens mount, of mechanism for moving the lens mount to an erect position and retaining it there including a slotted link pivoted to the lens mount, a swinging lever having a slidable engagement with the lens mount and having a pin extending through the slot in the link, an erecting member also having a slot of approximately the size of the slot in the link, the swinging lever pin extending through both slots and being adapted to move both members, pivots for the slotted link and erecting member spaced from each other, whereby these members will move through different paths, so that movement of the bed will cause the erecting link to engage the lens mount in advance of the swinging lever.

Signed at Rochester, New York this 26th day of Dec. 1923.

CHAS. F. SPEIDEL.